United States Patent
Cotte

(10) Patent No.: US 10,542,397 B2
(45) Date of Patent: Jan. 21, 2020

(54) SYSTEM FOR FORWARDING OBJECTS BY INDIVIDUALS OF A COMMUNITY, IMPLEMENTING A SPATIOTEMPORAL TRACKING SYSTEM

(71) Applicant: PA. COTTE SA, Pully (CH)

(72) Inventor: Pierre-Alain Cotte, Amberg (DE)

(73) Assignee: PA. COTTE SA, Pully (CH)

( * ) Notice: Subject to any disclaimer, the term of this patent is extended or adjusted under 35 U.S.C. 154(b) by 0 days.

(21) Appl. No.: 16/085,215

(22) PCT Filed: Jan. 9, 2017

(86) PCT No.: PCT/EP2017/050357
§ 371 (c)(1),
(2) Date: Sep. 14, 2018

(87) PCT Pub. No.: WO2017/157538
PCT Pub. Date: Sep. 21, 2017

(65) Prior Publication Data
US 2019/0098466 A1    Mar. 28, 2019

(30) Foreign Application Priority Data
Mar. 16, 2016 (FR) .................................... 16 52216

(51) Int. Cl.
| | |
|---|---|
| *H04B 7/00* | (2006.01) |
| *H04W 4/35* | (2018.01) |
| *G06Q 10/08* | (2012.01) |
| *H04W 4/029* | (2018.01) |

(52) U.S. Cl.
CPC .......... *H04W 4/35* (2018.02); *G06Q 10/0833* (2013.01); *G06Q 10/0835* (2013.01); *H04W 4/029* (2018.02)

(58) Field of Classification Search
CPC .............................. H04W 4/35; H04W 4/029
USPC ........................................................ 455/41.2
See application file for complete search history.

(56) References Cited

U.S. PATENT DOCUMENTS

| | | | | |
|---|---|---|---|---|
| 6,002,936 A | * | 12/1999 | Roel-Ng | H04W 64/00 455/456.4 |
| 6,094,642 A | * | 7/2000 | Stephenson | G06K 17/00 235/385 |
| 6,097,958 A | * | 8/2000 | Bergen | H04W 64/00 455/456.2 |

(Continued)

OTHER PUBLICATIONS

International Search Report and Written Opinion, dated Mar. 10, 2017, for related International Patent Application No. PCT/EP2017/050357; 18 pages.

*Primary Examiner* — April G Gonzales
(74) *Attorney, Agent, or Firm* — Faegre Baker Daniels LLP

(57) ABSTRACT

The invention relates to a system for forwarding articles by individuals of a community, implementing a spatiotemporal tracking system comprising a computing platform including at least one computer application intended to be loaded by portable computing units held by individuals of the community, and embedded devices, coupled to the articles, each comprising second near field wireless communication means, capable of communicating with the first near field wireless communication means, the computing units and the computer module comprising a shared computer application allowing the exchange of data between them.

13 Claims, 2 Drawing Sheets

(56) References Cited

U.S. PATENT DOCUMENTS

Figure 1:
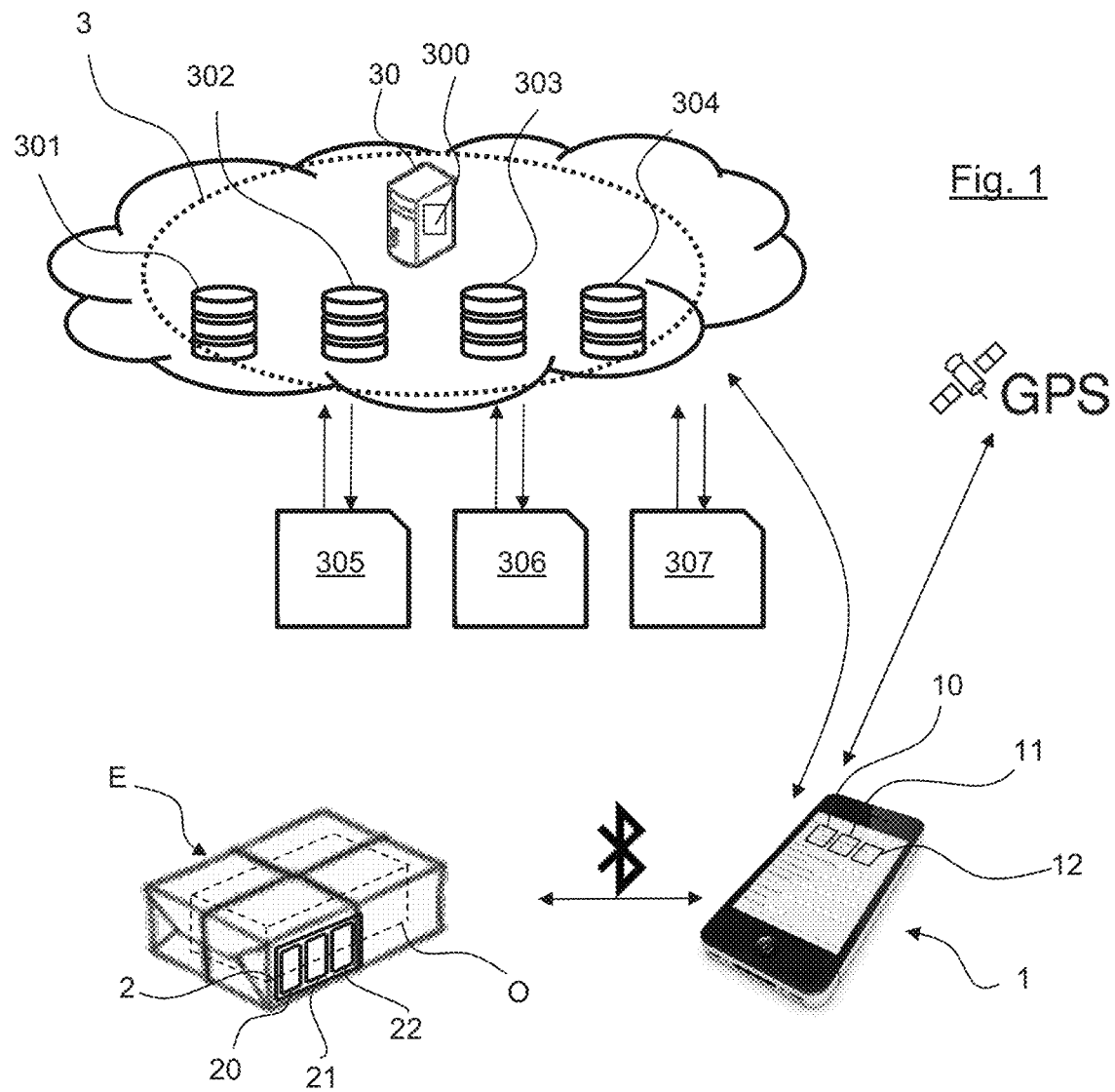

| | | | | |
|---|---|---|---|---|
| 6,385,458 B1* | 5/2002 | Papadimitriou | H04W 4/029 | 455/456.2 |
| 6,509,830 B1* | 1/2003 | Elliott | H04W 64/00 | 340/286.02 |
| 6,716,101 B1* | 4/2004 | Meadows | H04W 64/00 | 455/456.1 |
| 6,976,007 B1* | 12/2005 | Boucher | G06Q 10/08 | 705/28 |
| 7,013,148 B1* | 3/2006 | Ganesh | H04W 64/00 | 455/404.2 |
| 7,016,693 B2* | 3/2006 | Guyot | H04W 64/00 | 455/456.2 |
| 7,212,113 B2* | 5/2007 | Zanovitch | G08B 25/085 | 340/10.1 |
| 7,212,829 B1* | 5/2007 | Lau | G06Q 10/00 | 455/456.1 |
| 7,253,731 B2* | 8/2007 | Joao | G06Q 10/083 | 340/539.13 |
| 7,342,497 B2* | 3/2008 | Chung | G06Q 10/08 | 235/375 |
| 7,567,207 B2* | 7/2009 | Angus | G01S 19/25 | 342/357.72 |
| 7,574,447 B2* | 8/2009 | Cornelius | G06Q 10/025 | |
| 7,797,367 B1* | 9/2010 | Gelvin | G06F 15/173 | 709/200 |
| 7,865,408 B2* | 1/2011 | Bhadra | G06Q 10/08 | 705/22 |
| 7,974,637 B1* | 7/2011 | Taveniku | G06Q 10/0833 | 455/456.1 |
| 2001/0040506 A1* | 11/2001 | Boulay | B60R 25/1018 | 340/539.1 |
| 2002/0123353 A1* | 9/2002 | Savoie | B60R 25/102 | 455/456.5 |
| 2004/0192353 A1* | 9/2004 | Mason | G01S 5/0027 | 455/457 |
| 2005/0128074 A1* | 6/2005 | Culpepper | G08B 21/0269 | 340/539.1 |
| 2005/0234641 A1* | 10/2005 | Marks | G06Q 10/08 | 701/484 |
| 2006/0109106 A1* | 5/2006 | Braun | G06Q 10/08 | 340/539.13 |
| 2006/0229895 A1* | 10/2006 | Kodger, Jr. | G06Q 10/025 | 705/333 |
| 2007/0190943 A1* | 8/2007 | Little | G06Q 10/08 | 455/41.2 |
| 2007/0210914 A1* | 9/2007 | Brosius | G06Q 10/08 | 340/531 |
| 2007/0268138 A1* | 11/2007 | Chung | G01S 5/0018 | 340/572.1 |
| 2008/0061963 A1* | 3/2008 | Schnitz | G06Q 10/08 | 340/539.13 |
| 2008/0262646 A1* | 10/2008 | Breed | G01F 23/20 | 700/226 |
| 2009/0115609 A1* | 5/2009 | Weaver | G06Q 10/08 | 340/572.1 |
| 2009/0309722 A1* | 12/2009 | Nichols | G06Q 10/08 | 340/541 |
| 2010/0076902 A1* | 3/2010 | Kraft | G06K 17/0022 | 705/333 |
| 2014/0236856 A1* | 8/2014 | Baykhurazov | G06Q 10/0835 | 705/336 |

* cited by examiner

SYSTEM FOR FORWARDING OBJECTS BY INDIVIDUALS OF A COMMUNITY, IMPLEMENTING A SPATIOTEMPORAL TRACKING SYSTEM

This application claims priority to PCT Application Number PCT/EP2017/050357 filed Jan. 9, 2017, which in turn claims priority from French Patent Application Number 1652216 filed Mar. 16, 2016, the subject matter of which are incorporated herein by reference.

The field of the invention is that of logistics. More precisely, the invention relates to forwarding articles, and more particularly articles the dimensions and weight of which allow their forwarding by any person and by any, or almost any means.

Accordingly, the invention relates to a system for forwarding articles the weight of which does not exceed 8 kg or, more generally, the dimensions and weight of which correspond to the definition of a piece of hand luggage for airlines. Of course, the invention also applies to articles of smaller dimensions and/or weights, down to the shipping of single envelopes.

In the field of the invention, some providers buying and selling products online have generated considerable expectations for the delivery of said products throughout the world.

However, internationally, express deliveries, in a few hours, are complicated or even impossible and are, at the least, very slow and/or very expensive. There are therefore very limiting factors for international commerce and private deliveries, while Internet commerce knows no border. As a result, international express deliveries constitute only a very small market, this despite huge revenues experienced by some international delivery companies.

This finding is linked to the fact that all the current delivery logistics systems are based on a centralized control approach based notably on:
grouping the goods to be forwarded;
bulk transport;
consignment by parcel.

In addition, analysis of conventional practices leads to ascertaining that:
local mail services are restricted to limited deliveries over relatively small, or even local geographical areas (the adoption of business models consisting in making resources available to users by actors other than the conventional professionals, however, tending to generate new and significant opportunities);
national deliveries (more or less monopolistic) operating perfectly, within deadlines of around 24 hours, but this market is by definition limited to a single country;
international deliveries remain niche markets, favoring the development of specialized international delivery companies, with sometimes incompatible or even unacceptable deadlines and costs.

There is currently an expectation, express or implied, regarding the shipping and delivery of goods within short deadlines compared to current practice, for small fee amounts or even at low cost.

However, one way to satisfy this expectation lies in a community and/or collaborative approach, insofar as everyone is moving in a universe within which a large proportion of individuals together offer multiple opportunities for travel.

It is therefore conceivable according to this approach to set out with an article from a departure point by entrusting it to one of the individuals of a collaborative system and forward it to an arrival point via this individual alone or in relay with one or more other individuals of the collaborative system.

Of course, in such a system, it remains necessary to know in real time the position of the article to be forwarded, for locating it with respect to its arrival point and/or with respect to the individuals participating in the collaborative system.

In this context, for monitoring the movements of articles to be forwarded, they are provided with geolocation means and communication means allowing them to transmit data relating to their location. In this way a system of tracking the forwarding of the articles is obtained.

However, such a solution leads to a technical problem regarding the electrical power supply of the geolocation and communication means. Indeed, a system must further be provided for electrically recharging the power supply means dedicated to the geolocation of the article, which involves hard-to-manage constraints, involving transferring on to individuals of the collaborative system the responsibility for monitoring the electrical recharging of the means in question.

The invention notably has the objective of forming part of a collaborative logistical approach involving little or no constraint at the level of individuals participating in the forwarding of the articles, notably with regard to managing the electrical recharging level of the technical means coupled to the articles to be forwarded and involved in the spatiotemporal tracking of the articles.

Document US2014/236856 describes a system of this type. However, the system for forwarding articles by individuals of a community is not secure.

The invention therefore has the objective of providing a global system for forwarding articles, implementing such a tracking system, which is secure.

The invention also has the objective of providing such a system for forwarding articles which is easily accessible and practical to use for the senders of articles.

In addition, the invention has the objective of providing such a system for forwarding articles which ensures a fast and inexpensive service for the senders of articles.

The invention also has the objective of providing such a system for forwarding articles which is easily accessible and easy to use for individuals wishing to join the community contributing to the collaborative system.

These objectives, as well as others that will appear later, are achieved thanks to the invention, the object of which is a system for forwarding articles by individuals of a community, implementing a spatiotemporal tracking system comprising a computing platform including at least one computer application intended to be loaded by portable computing units held by the individuals of the community and comprising first near field wireless communication means and geolocation means, characterized in that it comprises devices embedded in packages intended to contain the articles, the embedded devices each comprising second near field wireless communication means, capable of communicating with the first near field wireless communication means, and at least one computer processing module capable of cooperating with the second near field wireless communication means for retrieving and processing data supplied by said second near field wireless communication means, and in that the computer module comprises said computer application with a view to allowing the exchange of data between the computer module and the portable computing units, the computer application being configured for opening a communication channel intended to allow the embedded devices to access and use the geolocation means of the computing units.

Thus, thanks to the invention, a spatiotemporal tracking system is obtained for tracking moving articles in a collaborative system for forwarding articles by individuals of a community, without transferring responsibility for the correct operation of the technical means coupled to the forwarded article, with regard in particular to the electrical recharging level of the technical means coupled to the article to be forwarded for ensuring its geolocation.

Indeed, technical means that are large consumers of electrical power, such as geolocation means, are absent from the technical means coupled to the forwarded article. Only means involving low power consumption are coupled to the forwarded article.

It follows that it is possible to electrically power technical means coupled to the forwarded article by a simple battery, capable of autonomously providing an electrical power supply over a long period.

According to the principle of the invention, the embedded devices are somehow grafted onto the portable, and optionally successive units during the mobility of the forwarded article, via the near field wireless communication means and use the "smartness" of the portable units, in particular regarding the geolocation means incorporated in the portable units.

The embedded devices can thus travel long distances in complete electrical autonomy. In addition, they may be reused many times, without having to recharge them electrically, by being coupled to different successive articles to be forwarded.

Of course, the possible repeated reuse of the embedded devices adds an obvious economic interest to the tracking system, as well as an optimized carbon footprint by avoiding the rapid obsolescence of the embedded devices, either wholly or in part.

According to an advantageous solution, the portable computing units consist of smartphones.

With such a collaborative system, the possibility is achieved of bringing together in the same community a very large number of individuals, mobile smartphones being widespread today with a very large coverage of the population.

Moreover, by definition, these mobile phones are carried by individuals. The result is that when an individual of the community carries an article to be forwarded, the embedded device is permanently close to the mobile phone of the individual in question, making it possible to communicate with it and to use its geolocation resources continuously or nearly so.

Advantageously, the embedded devices comprise electrical power supply means in the form of a non-rechargeable battery.

In this way the embedded devices may be provided with a long-life, relatively inexpensive battery. Thus, the only electrical power supply management consists in performing a simple replacement of the battery when it is completely discharged.

According to an advantageous embodiment of the forwarding system, the platform includes first long distance communication means, the computing units comprising second long distance communication means capable of communicating with the first long distance communication means.

In this way, it is possible to centralize all the information on geolocation, and more generally the forwarding of articles, on the platform, via smartphones carried by the individuals forwarding the articles.

In this case, the platform preferably comprises a remotely accessible server configured for receiving data for forwarding an article from a departure point to an arrival point.

Thus, clearly the platform may serve as business portal allowing a user to identify and declare their needs for forwarding an article from a departure point to an arrival point.

Advantageously, the server comprises means of storing geolocation data transmitted to the platform by the portable units.

According to a preferred embodiment, the server hosts a database concerning the articles to be forwarded including:
  information characterizing an article to be forwarded by weight and/or dimensions;
  a departure date from a geolocated location;
  a delivery date at a geolocated location.

Of course, it is also possible to enrich the database with other information, notably merchant type information, for identifying and billing the users.

Preferably, the server hosts a database concerning the portable units held by the individuals of the community including:
  a departure date of the individual;
  a departure location of the individual;
  an arrival date of the individual;
  an arrival location of the individual.

Here again, the server may also allow the enrichment of the database with additional data, concerning the identity of the individuals, their contribution to the forwarding of the article and the means of remunerating them.

According to an advantageous solution, each embedded device is identifiable by a digital identification code, the server hosting a database of digital identification codes of the embedded devices.

In this case, the platform comprises connection and communication means with user interfaces configured for transmitting requests to the platform for forwarding articles.

The invention also relates to a method of tracking an article forwarded with the aid of a system as previously described, characterized in that it includes the steps of:
  activating the computer application allowing the exchange of data between a portable unit and an embedded device;
  geolocation of the embedded device via the use of the geolocation means of the computing unit.

The invention also relates to a computer program comprising instructions suitable for executing the steps of the method previously described when said computer program is executed by at least one processor.

The invention further relates to a computer readable medium on which a computer program is recorded comprising instructions for executing the steps of the method previously described.

Figure 2:
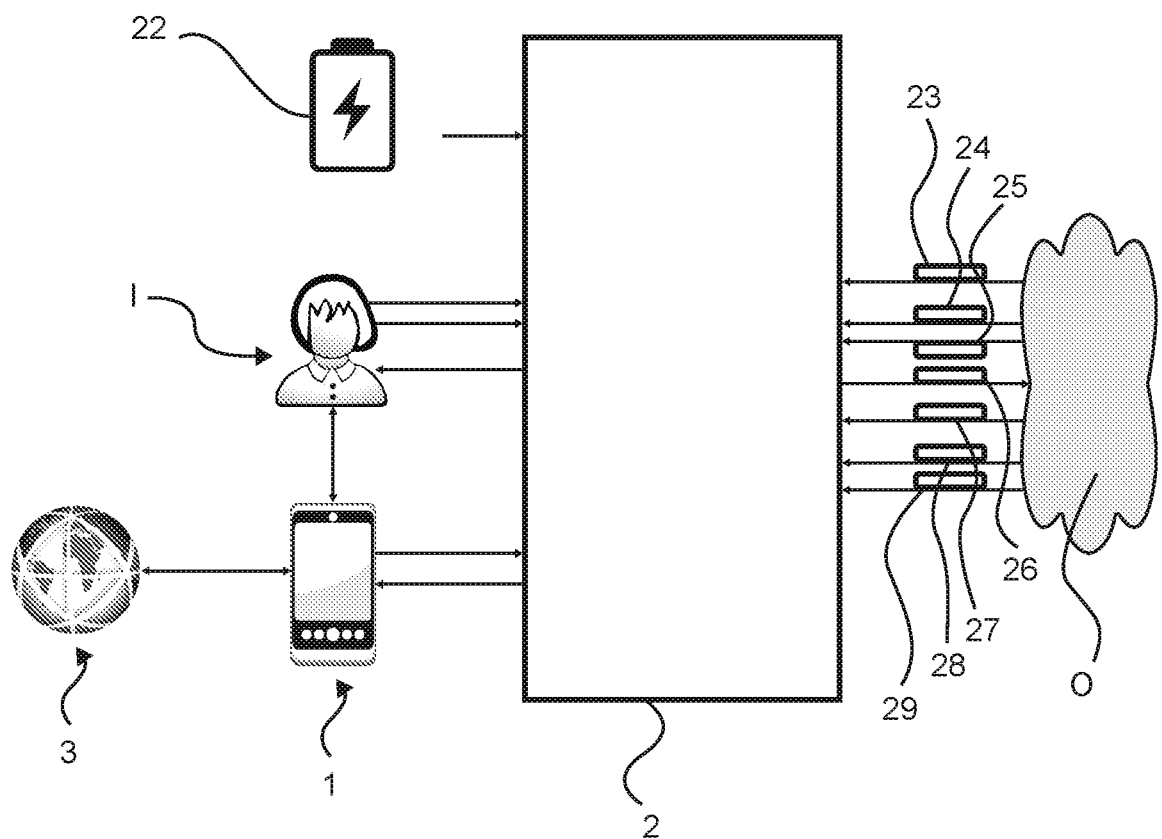

Other features and advantages of the invention will appear more clearly on reading the following description of a preferred embodiment of the invention, given by way of a simple, illustrative and non-restrictive example, and the appended drawings in which:

FIG. 1 schematically illustrates a system for forwarding articles according to the invention;

FIG. 2 provides a schematic illustration of a container capable of being used for forwarding an article, and of its environment in a system for forwarding articles according to the invention.

As previously noted, the principle of the invention is to provide a collaborative type of system for forwarding articles, i.e. implemented by a set of individuals of a community, said system implementing a spatiotemporal tracking system.

As illustrated by FIGS. 1 and 2, such a system is of the type comprising:
- portable computing units 1 held by individuals I of a community;
- a computing platform 3 including a computer application intended to be loaded by the portable computing units;
- embedded devices 2 in packages E intended to contain the articles O to be forwarded, these packages being able to be any container (envelope, parcel, packet, etc.) of shapes and dimensions suited to the article to be forwarded, (the dimensions of the container and the overall weight of the container added to that of the contents being preferably, but not exclusively, suited to the criteria defined for hand luggage according to the criteria of the airlines).

According to a particular and preferred embodiment, the portable computing units consist of smartphones of a widespread common type, notably comprising first near field wireless communication means 10 and geolocation means 11.

According to the principle of the invention, the forwarding system implements a system of tracking the articles comprising the computing platform 3, notably based on the use of the embedded devices 2 in their turn comprising second near field wireless communication means 20, capable of communicating with the first near field wireless communication means 10. In addition, these embedded devices comprise at least one computer processing module 21 capable of cooperating with the second near field wireless communication means 20 for retrieving and processing data supplied by these second communication means.

Of course, the embedded devices may comprise many other structural and functional means, referred to later.

According to the invention, the computer module 21 of the embedded devices and computing units 1 comprise a shared computer application allowing the exchange of data between them. This computer application is configured for opening a communication channel intended to allow the computer module 21 of the embedded devices 2 to access and use the geolocation means 11 of the computing units. In other words, the computer modules incorporate the computer application, which may also be loaded, from the computing platform, onto the computing units held by the individuals of the community. Once the link is established between the embedded device and the computing unit, the computer application (common to the embedded device and the computing unit) opens a communication channel via the first and second near field wireless communication means, and allows the embedded device to access and use the geolocation means of the computing unit.

Thus, as illustrated by FIGS. 1 and 2, the computer module of the embedded devices uses as resources dedicated to tracking, and therefore to geolocation, the resources of the portable computing units (therefore in this case those of the smartphone held by the individual forwarding the article), throughout the journey made by the individual. Of course, the tracking system applies also in the case where a plurality of individuals take turns to forward the article, the embedded device then successively communicating with each portable computing unit of the individuals.

As will be explained in more detail later, the geolocation of the article may also be achieved via a portable computing unit held by a depositary of the article, the article then optionally waiting to be picked up by a traveling individual.

According to an advantageous solution, the first near field wireless communication means and the second near field wireless communication means exchange data via Bluetooth (or via WiFi according to another conceivable embodiment).

The second near field wireless communication means and the computer processing module of the embedded devices are powered by a simple non-rechargeable battery 22.

It is noted that the embedded devices may correspond to other structural and/or functional means powered, periodically or continuously by the battery of the device, and notably:
- shock detection means 23;
- temperature sensor 24;
- humidity sensor 25;
- lighting means 26;
- video capture means 27;
- weight measurement means 28;
- opening/closure detection means 29;
- etc.

As can be seen in FIG. 1, the system for forwarding articles comprises a computing platform 3 for managing the forwarding of articles, including the first long distance communication means intended for communicating with second long distance communication means incorporated in the portable computing units.

This platform comprises a remotely accessible server 30 configured for receiving forwarding data for an article from a departure point to an arrival point. The method of entering the departure point and the arrival point is described in more detail later.

The server further comprises means of storing 300 geolocation data transmitted to the platform by the portable units.

The system of tracking the articles to be forwarded is therefore not restricted to the local storage of the geolocation data transmitted by the portable computing units within the computer module of the embedded devices. On the contrary, in addition to the geolocation resources of the portable computing units used by the embedded devices, the latter also use the long distance communication means of the portable computing units for exchanging with the management platform.

Furthermore, the server hosts a first database 303 concerning the "client" individuals and the articles to be forwarded including:
- information characterizing an article to be forwarded by weight and size;
- a departure date from a geolocated location;
- a delivery date from a geolocated location.

The server also hosts a second database 302 concerning the "traveling" individuals of the community and their portable computing units, including (in addition to the identity of the individuals):
- a departure date of the individual;
- a departure location of the individual;
- an arrival date of the individual;
- an arrival location of the individual.

It is noted that each embedded device is identifiable by a digital identification code, the server 30 hosting a database of digital identification codes 301 of the embedded devices.

It is further noted that the platform comprises connection and communication means with the user interfaces configured for transmitting requests for forwarding articles, to the platform.

In practice, these interfaces consist of smartphones on which a dedicated computer application has been loaded. The service may also be available from a computer.

The server also hosts a third database 304 concerning the "depositary" individuals of the community and their portable computing units and/or their computer, including (in addition to their identity):
- their geographical position;
- the number of packages (with embedded device) that they have.

The databases 302, 303 and 304 may be separate or grouped within a global database. Each of them is capable of receiving data in conjunction with the computer applications dedicated to the user profile, in this case to the "traveling" computer application 305, the "client" computer application 306 and the "depositary" computer application 307 respectively.

The process of forwarding the articles and interacting between the individuals in a system for forwarding according to the invention will now be described.

According to a first example of forwarding, an article is forwarded from one depositary location to another depositary location, the user of the service sending the article then having to go to the first depositary location to remove the article to be forwarded and the recipient individual has to go to the second depositary location to pick up the forwarded article.

According to this process, the user having an article to be forwarded connects to the system's platform for accessing the user interface allowing them to enter:
- a departure date, from a geolocated location (insofar as the user knows the closest depositary location, otherwise the platform may specify this depositary location according to the geolocation of the user, e.g. according to their place of work or their residence);
- a delivery date and a geolocated location (that may take the form of a destination address);
- the weight and/or dimensions of the article;
- optionally, a means of payment.

According to the departure geolocation means entered, the platform reserves a shipping packet provided with an embedded device as previously described, and reports this reservation to the depositary location. If no shipping packet is available at the specified depositary location, the platform provides a service for consigning a shipping packet to the specified depositary location.

The user goes to the first depositary location with their article to be forwarded. With the aid of a dedicated computer application loaded onto the user's smartphone, the latter transmits the data relating to the article and its forwarding to the depositary, who has the same computer application on their smartphone (or on a computer). With the aid of these identification data, the depositary identifies the shipping packet assigned to the article to be forwarded (the platform of the service having chosen a specific digital identification code of the embedded device incorporated in the shipping packet).

The depositary has the article to be forwarded in the identified shipping packet. The user validates, via their dedicated application, the handover to the depositary, the latter digitally accepting this handover, then making them responsible for the article and the shipping packet.

It is noted at this stage that the embedded device of the shipping packet begins to communicate, via the near field wireless communication means, with the smartphone of the depositary to access the geolocation resources of this smartphone.

In parallel with this, a community of individuals is declared to the system's management platform, who notably enter:
- a departure date;
- a departure location;
- an arrival date;
- an arrival location.

With the user data, and the data on the individuals of the community and on their movement, the server of the platform forms two databases, namely a database concerning the articles to be forwarded and a database concerning the portable units held by the individuals, with the data relating to the movement of the individuals.

The management system compares in real time the data relating to the shipping packet present in the depositary premises and ready to be shipped, with the database relating to the individuals of the community and to their movement. This comparison leads the platform to choose an individual for their presence near the departure depositary location and for their destination near the arrival depositary location. An alert is sent e.g. by SMS on the smartphone of the traveling individual indicating to them the time and the location where they should go to pick up the shipping packet including the article to be forwarded.

At the departure depositary location, the traveler is identified to the depositary with the aid of the computer program loaded onto their smartphone, and transmits to the depositary the identification of the shipping packet that they have just picked up.

The depositary validates the handover of the shipping packet to a traveling individual, via the computer system, which leads to:
- disconnecting the smartphone of the depositary from the device embedded in the packet;
- connecting the device embedded in the shipping packet to the smartphone of the traveling individual.

The traveling individual goes to the second depositary location, namely the arrival depositary location. During the journey, the device embedded in the shipping packet is permanently connected with the smartphone of the traveling individual, ensuring monitoring and geolocation of the forwarded article, these data being able to be transmitted periodically to the platform so as to be accessible to the user and the sender.

At the arrival depositary location, the traveling individual hands over the shipping packet to the depositary, indicating via computer the packet and shipment identification to the depositary, the latter validating via computer that the shipping packet has been taken in charge, which leads to:
- disconnecting the embedded device of the shipping packet from the smartphone of the traveling individual;
- connecting the embedded device of the shipping packet to the smartphone of the depositary.

Acceptance of taking charge of the shipping packet by the arrival depositary is reported via computer to the system's management platform, which sends an alert signal by SMS to the recipient user, by transmitting the geolocation data of the arrival depositary location to them.

The recipient individual goes to the arrival depositary location and is identified to the depositary via the computer application previously loaded onto their smartphone.

The depositary verifies the identity of the recipient individual via computer and validates the handover of the shipping packet to this individual, which leads to:
- disconnecting the packet's embedded device from the depositary's smartphone;

connecting the embedded device of the shipping packet to the recipient individual's smartphone.

The recipient user validates the receipt of the shipping packet via computer, this validation being transmitted to the system's management platform which informs the sending user by SMS.

Of course, the depositary forwarding system and depositary just described may be enriched upstream and downstream, via the intervention of a traveling individual forwarding the shipping packet between the sending individual and the depositary departure location, and by the intervention of a traveling individual who may, at the other end of the forwarding, ensure the movement of the shipping packet from the depositary arrival location to the recipient individual.

It should be noted that the forwarding system according to the invention may be implemented by a system of transferring responsibility, aimed at ensuring a tracking of the successive acts of taking charge of the package or packages provided with the embedded devices previously described.

According to a particular embodiment, this system of transferring responsibility provides that the server of the system's platform comprises a database including identification and monitoring data for each embedded device. More precisely, the identification data may comprise, both the Bluetooth number of the computer module and a journey number, defined by the server of the platform and assigned to the embedded device by coupling the Bluetooth number and the journey number. This assignment is performed in practice at the time the article is inserted in the package, the person performing this operation being connected to the server and linking the digital file of the forwarding to be performed (requested and recorded by the sender of the article) to a visual code (number or QR code, or other) borne by the package (all the packages, and therefore all the Bluetooth numbers, with the corresponding visual codes being known to the server).

A "person in charge" field is also associated with the identification and monitoring data of the embedded device.

Thus, the system of transferring responsibility is programmed for executing the following steps (by the server of the system's platform):

associating, in the "person in charge" field, the identity of the person taking charge of the package (and the article it contains) with the list of identification and monitoring data of the device embedded in the package, with timestamping of this association;

sending to a new person about to take charge of the package, an acceptance request sent by the person about to transmit the package via the system's platform;

receiving the acceptance sent by the person taking charge of the package;

modifying, in the "person in charge" field, the identity of the person taking charge of the package (and the article it contains), with timestamping of this modification.

It is noted that the steps that have just been described assume that both persons, the one who gives up taking charge and the one that takes it, have a connection to the server of the platform.

It is, however, conceivable, in the event that one of the persons, or even both persons, do not have a connection to the server, to modify and temporarily store the change in information relating to the person in charge of the package, the information being transmitted to the server by the corresponding smartphone (or the corresponding computer) as soon as the connection is recovered (or even by the smartphone of a third person).

The invention claimed is:

1. A system for forwarding articles by individuals of a community, implementing a spatiotemporal tracking system comprising a computing platform including at least one computer application intended to be loaded by portable computing units held by individuals of the community and comprising first near field wireless communication means and geolocation means, comprising:

devices embedded in packages intended to contain the articles, the embedded devices each comprising second near field wireless communication means, capable of communicating with the first near field wireless communication means, and at least one computer processing module capable of cooperating with the second near field wireless communication means for retrieving and processing data supplied by said second near field wireless communication means, the computer module comprises said computer application with a view to allowing the exchange of data between the computer module and the portable computing units, the computer application being configured for opening a communication channel intended to allow the embedded devices to access and use the geolocation means of the computing units.

2. The system of claim 1, wherein the portable computing units consist of smartphones.

3. The system of claim 1, wherein the embedded devices comprise electrical power supply means in the form of a non-rechargeable battery.

4. The system of claim 1, wherein the platform includes first long distance communication means, the computing units comprising second long distance communication means capable of communicating with the first long distance communication means.

5. The system of claim 4, wherein the platform comprises a remotely accessible server, configured for receiving data for forwarding an article from a departure point to an arrival point.

6. The system of claim 5, wherein the server comprises means of storing geolocation data transmitted to the platform by the portable units.

7. The system of claim 5, wherein the server hosts a database concerning the articles to be forwarded including:
information characterizing an article to be forwarded by weight and/or dimensions;
a departure date from a geolocated location;
a delivery date at a geolocated location.

8. The system of claim 5, wherein the server hosts a database concerning the portable computing units held by the individuals of the community including:
a departure date of the individual;
a departure location of the individual;
an arrival date of the individual;
an arrival location of the individual.

9. The system of claim 5, wherein each embedded device is identifiable by a digital identification code and in that the server hosts a database of digital identification codes of the embedded devices.

10. The system of claim 9, wherein the platform comprises connection and communication means with user interfaces configured for transmitting requests for forwarding articles to the platform.

11. A method of tracking an article forwarded with the aid of a system of claim 1, wherein it comprises the steps of:

activating the computer application allowing the exchange of data between a portable unit and an embedded device;

geolocation of the embedded device via the use of the geolocation means of the computing unit.

12. A computer program comprising instructions suitable for executing the steps of the method of claim 11, when said computer program is executed by at least one processor.

13. A computer-readable recording medium on which a computer program is recorded comprising instructions for executing the steps of the method of claim 1.

* * * * *